US008997478B2

(12) United States Patent
McWethy et al.

(10) Patent No.: US 8,997,478 B2
(45) Date of Patent: Apr. 7, 2015

(54) MULTI-PUMP SYSTEM WITH PUMP-FLOW DIVERSION

(75) Inventors: Erik W. McWethy, Dubuque, IA (US); Mark D. Anderson, Dubuque, IA (US)

(73) Assignee: Deere & Company, Moline, IL (US)

( * ) Notice: Subject to any disclaimer, the term of this patent is extended or adjusted under 35 U.S.C. 154(b) by 867 days.

(21) Appl. No.: 13/240,789

(22) Filed: Sep. 22, 2011

(65) Prior Publication Data

US 2013/0074486 A1 Mar. 28, 2013

(51) Int. Cl.

| | |
|---|---|
| ***F16D 31/02*** | (2006.01) |
| ***F15B 21/08*** | (2006.01) |
| ***E02F 3/96*** | (2006.01) |
| ***E02F 9/22*** | (2006.01) |

(52) U.S. Cl.

CPC ..... *F15B 21/087* (2013.01); *F15B 2211/20538* (2013.01); *F15B 2211/20576* (2013.01); *F15B 2211/3116* (2013.01); *F15B 2211/45* (2013.01); *F15B 2211/633* (2013.01); *F15B 2211/6346* (2013.01); *E02F 3/964* (2013.01); *E02F 9/2292* (2013.01); *E02F 9/2242* (2013.01)

(58) Field of Classification Search

USPC .................... 60/421, 428, 429, 430, 468, 486

See application file for complete search history.

(56) References Cited

U.S. PATENT DOCUMENTS

| | | | | |
|---|---|---|---|---|
| 3,796,336 | A | 3/1974 | Ratcliff | |
| 3,916,624 | A * | 11/1975 | Machens et al. | 60/468 |
| 3,916,767 | A | 11/1975 | Barton | |
| 3,975,909 | A * | 8/1976 | McBurnett | 60/430 |
| 4,123,907 | A | 11/1978 | Bianchetta et al. | |
| 5,081,837 | A * | 1/1992 | Ueno | 60/430 |
| 5,848,531 | A | 12/1998 | Nakamura et al. | |
| 6,202,411 | B1 | 3/2001 | Yamashita | |
| 6,430,850 | B1 * | 8/2002 | VanDerZyl et al. | 60/486 |
| 6,901,754 | B2 * | 6/2005 | Jervis | 60/468 |
| 6,990,807 | B2 * | 1/2006 | Bird et al. | 60/468 |
| 2012/0096843 | A1 | 4/2012 | Hennemann et al. | |

OTHER PUBLICATIONS

Deere J Backhoes 315 SJ Product Brochure (6 pages) (Jan. 20, 2011).
Deere J Backhoes Product Brochure (40 pages) (Aug. 1, 2011).
Background Information (1 page) (prior art before Sep. 22, 2011).
Annotated Excerpts from Deere 310SE Backhoe Loader Tech Manual (7 pages) (Nov. 19, 1997).
Deere 310SE Backhoe Loader Hydraulic Schematic (1 page) (prior art before Sep. 22, 2011).

* cited by examiner

*Primary Examiner* — Michael Leslie

(57) ABSTRACT

A work vehicle has a pump group with two fixed-displacement pumps, an electro-hydraulic diverter openable to divert flow from one of the pumps to a fluid reservoir, and a controller configured to command the diverter to open.

19 Claims, 4 Drawing Sheets

MULTI-PUMP SYSTEM WITH PUMP-FLOW DIVERSION

FIELD OF THE DISCLOSURE

The present disclosure relates to diversion of flow from a pump in a multi-pump system.

BACKGROUND OF THE DISCLOSURE

As fuel prices continue to rise, reducing fuel consumption is becoming more important in, for example, the construction market. For example, it is important in North America and especially important in regions of the world such as, for example, India, to name just two regions. Due to increasing fuel prices and demands to improve overall vehicle efficiency, manufacturers are being asked to find new methods to reduce the hydraulic power consumed during operation. Many of these solutions are relatively high cost and complex systems such as load-sensing valves and variable-displacement pumps. Those systems are also relatively sensitive to contamination-related problems.

There are hydraulic systems which use open-center valves and fixed-displacement gear pumps. An open-center valve has a neutral position that allows fluid to flow continuously through the valve, as opposed to a closed-center valve which blocks fluid from flowing through the valve in its neutral position. Hydraulic systems that use open-center valves and fixed-displacement gear pumps tend to be relatively simple, cost effective, and contamination tolerant.

However, such systems tend to be inefficient. A significant amount of power is wasted by running the full pump flow through open-center valves when the flow is not needed.

SUMMARY OF THE DISCLOSURE

According to an aspect of the present disclosure, a work vehicle comprises a fluid reservoir, a pump group comprising a fixed-displacement first pump and a fixed-displacement second pump such that the first and second fixed-displacement pumps are flow-parallel to one another, an actuator, an open-center directional control valve positioned fluidly between the pump group and the actuator, an electro-hydraulic diverter coupled fluidly to a point between the second pump and the directional control valve and to the fluid reservoir to divert flow from the second pump to the fluid reservoir when the diverter is opened, a speed sensor positioned to sense a speed parameter of the work vehicle or an operator input device configured for manual selection of a diversion setting independent of any seat position of the work vehicle, and a controller. The controller is configured to receive a speed signal indicative of the speed parameter or a diversion setting signal indicative of the selected diversion setting, determine if the speed parameter satisfies predetermined speed criteria or determine a state of the selected diversion setting, and command the diverter to open if the speed parameter satisfies the predetermined speed criteria or if the selected diversion setting is in a flow-diversion state.

In an example, the work vehicle comprises the speed sensor positioned to sense the speed parameter. In such a case, the controller is configured to receive the speed signal indicative of the speed parameter, determine if the speed parameter satisfies the predetermined speed criteria (e.g., the speed parameter is at least a speed threshold), and command the diverter to open if the speed parameter satisfies the predetermined speed criteria. This mode of flow-diversion is referred to herein as the speed flow-diversion mode. The speed flow-diversion mode reduces hydraulic power wastage promoting fuel efficiency during propulsion of the vehicle at speed (sometimes referred to as "transporting" or "roading" of the work vehicle).

In another example, the work vehicle comprises the operator input device configured for manual selection of the diversion setting independent of any seat position of the work vehicle. In such a case, the controller is configured to receive the diversion setting signal, determine the state of the selected diversion setting, and command the diverter to open if the selected diversion setting is in the flow-diversion state. The operator thus has the option to divert the flow of the second pump at will (for the sake of clarity, "operator" as used herein means a human operator). The operator may wish to do so, for example, to promote fuel efficiency during idle conditions or to exercise relatively fine control of a tool of the work vehicle (e.g., during craning operations such as when a backhoe section of a backhoe loader may be used to move a pipe around or to move a manhole cover carried by the bucket of the backhoe section), to name but two examples. This mode of flow-diversion is referred to herein as the operator flow-diversion mode.

The speed sensor may be configured in a wide variety of ways. For example, the speed sensor may be positioned to sense a rotational speed of a component of the propulsion system of the work vehicle, such as, for example, a transmission, an engine, a final drive, a ground-engaging element, etc. In another example, the speed sensor may be configured to sense an actual ground speed of the work vehicle, and, as such, may be, for example, a radar device or a GPS device (global positioning system device). In another example, the speed parameter may be a gear ratio. As in each of those examples, the speed parameter may be an indication of a ground speed of the work vehicle.

The operator input device for manual selection of the diversion setting may be configured in a wide variety of ways. For example, the operator input device may comprise a display monitor configured for manual selection of the diversion setting. The display monitor may have one or more buttons to navigate to the proper menu screen and select the flow-diversion state or a flow-non-diversion state. In other examples, the operator input device 36 may have a stand-alone device in addition to the display monitor for navigating through the menu screens and selection choices and selecting the desired setting. The stand-alone device may substitute for one or more of the buttons 60, 62, 64. In yet other examples, the operator input device 36 for manual selection of the diversion setting may include the stand-alone device but not the display monitor. The stand-alone device may take the form of, for example, one or more buttons, a dial, a slide, a rocker, a switch, or the like, and a position sensor, if needed, to sense the position of the stand-alone device.

The operator diversion request may be a direct request from the operator, as opposed to a request that may be inferred from, or be a consequence of, another operator request (e.g., pivoting an operator seat from facing in a first direction to facing in an opposite second direction).

The work vehicle may be a backhoe loader comprising a backhoe mode to operate a backhoe section of the backhoe loader and a loader mode to operate a loader section of the backhoe loader. The controller may be configured to command the diverter to open in each of the loader mode and the backhoe mode if the selected diversion setting is in the flow-diversion state.

According to another aspect of the present disclosure, a work vehicle comprises a hydraulic system, an operator input device, and a controller. The hydraulic system comprises a fluid reservoir, a pump group comprising a fixed-displacement first pump and a such that the first and second pumps are flow-parallel to one another, an actuator, an open-center directional control valve positioned fluidly between the pump group and the actuator, an electro-hydraulic diverter coupled fluidly to a point between the second pump and the directional control valve and to the fluid reservoir to divert flow from the second pump to the fluid reservoir when the diverter is opened, and a pressure sensor positioned to sense a supply pressure in the hydraulic system. The operator input device is configured for manual selection of a pressure threshold setting. The controller is configured to receive a supply pressure signal indicative of the supply pressure and a pressure threshold signal indicative of the pressure threshold setting, determine if the supply pressure is at least the pressure threshold setting, and, if so, command the diverter to open. This flow-diversion mode is referred to herein as the pressure flow-diversion mode.

An operator may thus select the pressure threshold setting as desired. A lower pressure threshold setting may tend to promote fuel efficiency over productivity (productivity measured, for example, in terms of cycle time such as, with respect to, a backhoe loader or other work vehicle that can perform generally repetitive operations), whereas a higher pressure threshold setting may tend to promote productivity over fuel efficiency. The operator may thus control the balance between fuel efficiency and productivity based, for example, on operational goals.

The operator input device may be configured for manual-selection of the pressure threshold setting from a range of selectable values in a wide variety of ways. The operator input device may have a display monitor configured for manual selection of the pressure threshold setting. The display monitor may have one or more buttons for navigating through the menu screens and selection choices and selecting the desired pressure threshold setting. In other examples, the operator input device may have a stand-alone device in addition to the display monitor for navigating through the menu screens and selection choices and selecting the desired setting. The stand-alone device may substitute for one or more of the buttons. In yet other examples, the operator input device for manual selection of the pressure threshold setting may include the stand-alone device but not the display monitor. The stand-alone device may take the form of, for example, one or more buttons, a dial, a slide, a rocker, a switch, or the like, and a position sensor, if needed, to sense the position of the stand-alone device.

According to a variation of the pressure flow-diversion mode, a work vehicle comprises a first implement section (e.g., backhoe section of a backhoe loader), a second implement section (e.g., loader section of the backhoe loader), a section sensor configured to sense which of the first implement section and the second implement section is in focus (e.g., enabled), a hydraulic system, and a controller. The hydraulic system comprises a fluid reservoir, a pump group comprising a fixed-displacement first pump and a fixed-displacement second pump such that the first and second pumps are flow-parallel to one another, open-center directional control valving (i.e., one or more directional control valves), an electro-hydraulic diverter coupled fluidly to a point between the second pump and the directional control valving and to the fluid reservoir to divert flow from the second pump to the fluid reservoir when the diverter is opened, and a pressure sensor positioned to sense a supply pressure in the hydraulic system. The controller is configured to receive a supply pressure signal indicative of the supply pressure and a section signal indicative of which of the first implement section and the second implement section is in focus, determine which of the first implement section and the second implement section is in focus, select a first pressure threshold setting as a selected pressure threshold setting if the first implement section is in focus or a second pressure threshold setting as the selected pressure threshold setting if the second implement section is in focus, determine if the supply pressure is at least the selected pressure threshold setting, and, if so, command the diverter to open.

According to another aspect of the present disclosure, a work vehicle comprises a fluid reservoir, a pump group comprising a fixed-displacement first pump and a such that the first and second pumps are flow-parallel to one another, an actuator, an open-center directional control valve positioned fluidly between the pump group and the actuator, an electro-hydraulic diverter coupled fluidly to a point between the second pump and the directional control valve and to the fluid reservoir to divert flow from the second pump to the fluid reservoir when the diverter is opened, a start-up sensor positioned to sense start-up of the work vehicle, an engine, an engine speed sensor positioned to sense information indicative of a rotational speed of the engine ("engine speed"), and a controller. The controller is configured to receive a start-up signal indicative of start-up of the work vehicle and an engine speed signal indicative of the engine speed, determine if start-up of the work vehicle has occurred and the engine speed is below an engine speed threshold, and command the diverter to open if start-up of the work vehicle has occurred and the engine speed is below the engine speed threshold. This flow-diversion mode reduces parasitic loads on the engine at start-up so that the engine can start more easily (especially helpful in cold temperatures). It is referred to herein as the start-up flow-diversion mode.

The start-up sensor may be a key switch. The controller may be coupled electrically to the key switch. As such, when the key switch closes, the controller is put in electrical communication with the battery, at which point the controller determines that start-up of the vehicle has occurred. The key switch closes in response to turning of a physical key, pressing of a start-up button, or other start-up event.

The engine speed sensor may be an alternator coupled operably to the engine. The alternator is driven by a belt between the alternator and an output shaft of the engine. The controller is coupled electrically to the alternator to receive an electrical signal therefrom. The signal is an alternating current signal (e.g., square wave). The controller determines the engine speed using this signal and geometry relating to the pulley ratio between a drive pulley to which the engine output shaft is coupled and a driven pulley to which the alternator is coupled, the belt trained about those pulleys. The alternator signal may thus be characterized as an engine speed signal. Other engine speed sensors may be used in lieu of the alternator, such as, for example, an engine crankshaft speed sensor.

The work vehicle may have any one or more of the flow-diversion modes disclosed herein. It may have only one of the flow-diversion modes, or any combination of two or more of the flow-diversion modes. In a particular application of a backhoe loader, the backhoe loader may have the speed flow-diversion mode, the operator flow-diversion mode, and the start-up flow-diversion mode. In another application of a backhoe loader, the backhoe loader may have the pressure flow-diversion mode alone or in combination with any of the other flow-diversion modes (e.g., all three of the other modes).

In the absence of activation of a flow-diversion mode, the flows from the first and second pumps combine and are supplied to the directional control valve(s) of the hydraulic system. When activated, the speed flow-diversion mode promotes fuel efficiency of the vehicle, the operator flow-diversion mode and the pressure flow-diversion mode promote operator controllability, and the start-up flow-diversion mode promotes ease of engine start-up, especially useful in relatively cold temperatures.

In an example of the speed flow-diversion mode, the work vehicle has a gear ratio selector and a gear ratio sensor configured to sense a gear ratio selected by the gear ratio selector. The controller is configured to receive the speed signal indicative of a ground speed of the work vehicle as the speed parameter and a gear ratio signal indicative of the selected gear ratio, determine if the ground speed is at least a speed threshold and the selected gear ratio is at least a gear ratio threshold, and command the diverter to open if the ground speed is at least the speed threshold and the selected gear ratio is at least the gear ratio threshold. The controller is configured to command the diverter to close if the ground speed is at least the speed threshold but the selected gear ratio is below the gear ratio threshold, so that flow from both pumps will still be available for function operation and productivity.

According to a variation of the pressure flow-diversion mode,

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
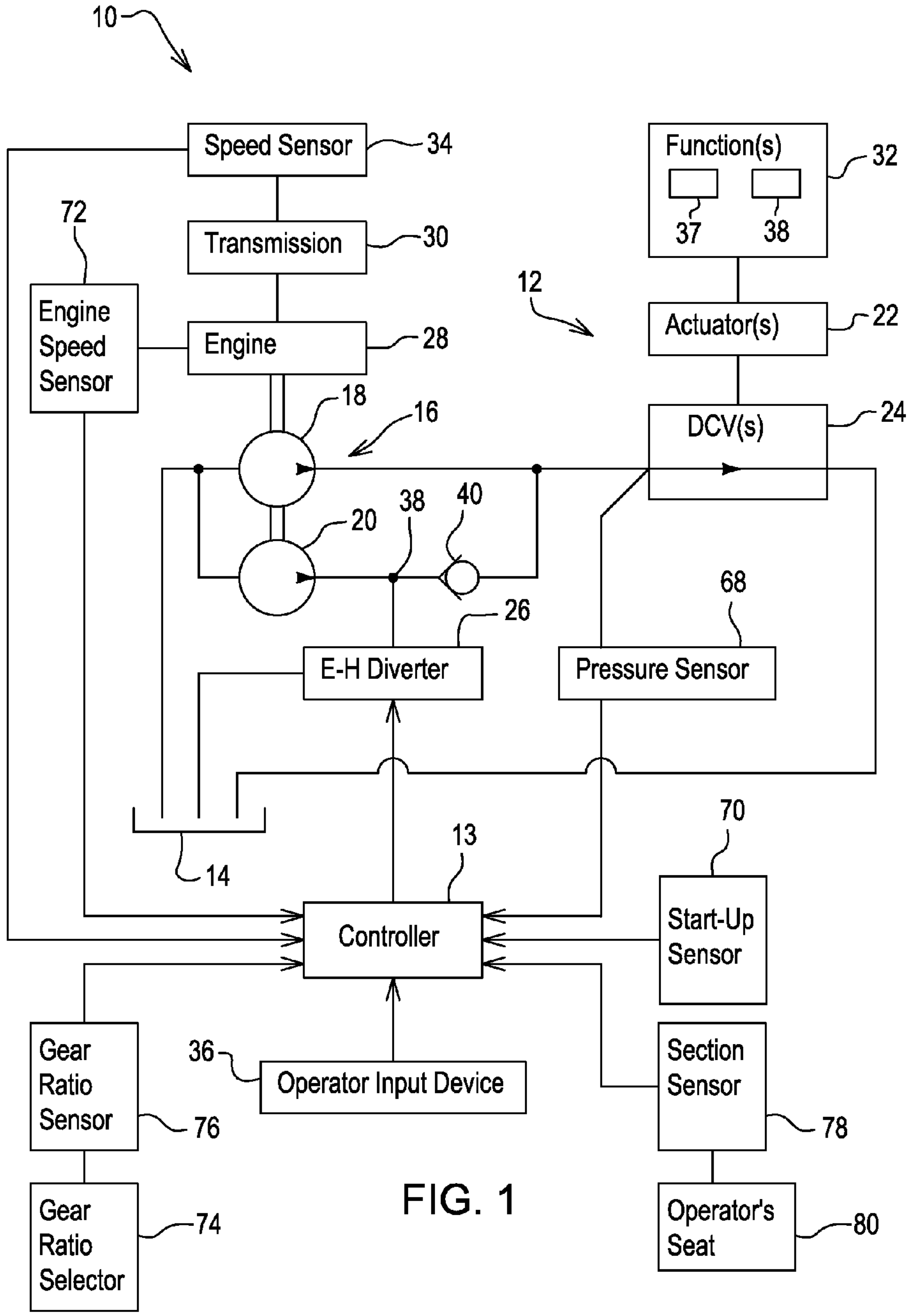
FIG. 1 is a diagrammatic view of a work vehicle.

Referring to FIG. 1, a work vehicle 10 has a hydraulic system 12 and a controller 13. The hydraulic system 12 has a fluid reservoir 14 (e.g., hydraulic oil reservoir), a pump group 16 having a fixed-displacement first pump 18 and a fixed-displacement second pump 20 such that the first and second pumps 18, 20 are flow-parallel to one another, an actuator 22, an open-center directional control valve 24 positioned fluidly between the pump group 16 and the actuator 22, and an electro-hydraulic diverter 26 coupled fluidly to a point between the second pump 20 and the directional control valve 24 and to the fluid reservoir 14 to divert flow from the second pump 20 to the fluid reservoir 14 when the diverter 26 is opened.

The pumps 18, 20 may be driven together. In the illustrated example; the pumps 18, 20 are coupled in tandem to an engine 28 of the vehicle 10. They may be coupled to the same output shaft of the engine 28 or separate output shafts of the engine 28. In other examples, the pumps 18, 20 may be coupled in tandem to a transmission 30 of the vehicle 10, to the same output shaft of the transmission 30 or separate output shafts of the transmission 30.

The pumps 18, 20 are fixed-displacement pumps. As such, the fluid volume per revolution displaced by each pump 18, 20 is invariable. The pumps 18, 20 may be, for example, gear pumps. The pumps 18, 20 have the same fixed displacement. In other examples, the pumps 18, 20 may have different fixed displacements.

The directional control valve 24 is of the open-center type. As such, in its neutral position (diagrammatically indicated in FIG. 1), the valve 24 is configured to allow fluid to flow continuously therethrough. Exemplarily, in the neutral position of the valve 24, the fluid is routed away from each actuator 22 back to the reservoir 14. When the valve 24 is shifted from its neutral position, the valve 24 supplies hydraulic fluid to the actuator 22 and routes return fluid to the reservoir 14.

The actuator 22 may be any type of actuator operated by fluid so as to actuate a respective function 32 of the vehicle 10. For example, the actuator 22 may be a cylinder, a motor, etc. The function 32 may be any type of function on the vehicle 10, such as, for example, a boom, a bucket, an arm, etc.

The hydraulic fluid may be filtered and then cooled before it is returned to the reservoir 14. As such, the hydraulic system 12 may include a hydraulic filter downstream of the directional control valve(s) 24 and a hydraulic oil cooler downstream of the hydraulic filter.

According to a speed flow-diversion mode of the vehicle 10, the vehicle 10 has a speed sensor 34 positioned to sense a speed parameter of the work vehicle 10. The controller 13 is configured to receive a speed signal indicative of the speed parameter, determine if the speed parameter satisfies predetermined speed criteria, and command the diverter 26 to open if the speed parameter satisfies the predetermined speed criteria.

In an example of the predetermined speed criteria, the controller 13 is configured to determine if the speed parameter is at least a speed threshold, and, if so, command the diverter 26 to open. For example, the speed parameter may be an indication of a ground speed of the work vehicle. The speed threshold may be a value stored in the memory of the controller 13 (e.g., 12.9 kilometers per hour). It may be stored, for example, at the time of manufacture or it may be operator selectable so as to be stored upon selection by the operator.

Diverting the flow of the second pump 20 at the speed threshold promotes fuel efficiency during propulsion of the vehicle 10 at speed (sometimes referred to as “transporting” or “roading” of the vehicle 10), since it is assumed that the function 32 will not be used during propulsion of the vehicle 10 (or may involve only minimal use during propulsion). The function 32 may thus not be part of the propulsion system of the vehicle 10 (i.e., a non-propulsion function), the propulsion system including the engine 28, the ground-engaging drive elements of the vehicle 10, and the elements therebetween. As such, when at transport speeds, the flow of the second pump 20 is diverted to the fluid reservoir 14, reducing the pressure drop across the directional control valve(s) 24 of the hydraulic system 12. During activation of the speed flow-diversion mode (or any flow-diversion mode disclosed herein), the first pump 18 continues to supply the hydraulic fluid so that steering and minor corrections to other functions 32 can still be performed.

The speed sensor 34 may be configured in a wide variety of ways. For example, the speed sensor 34 may be configured to sense a rotational speed of an element of the propulsion system, as an indication of ground speed (in non-slip conditions). In the illustrated example, the speed sensor 34 is positioned to sense a rotational output speed of the transmission 30 as the speed parameter (e.g., the rotational output speed of an output shaft of the transmission 30). Such a speed parameter may be particularly suitable in the case where there is a torque converter between the engine 26 and the transmission 30. In the case of a direct-drive propulsion system in which the engine 28 and the transmission 30 are mechanically coupled to one another without a torque converter therebetween, the speed sensor 34 may be positioned to sense a rotational output speed of an output shaft of the engine 28 as the speed parameter (i.e., an engine speed sensor such as the engine speed sensor 72). In other examples, the speed sensor may be positioned at a final drive of the vehicle 10 to sense a rotational speed of a component thereof (e.g., an input shaft) as the speed parameter, or may be positioned at a ground-engaging element of the vehicle 10 (e.g., wheel) to sense a rotational speed of that element as the speed parameter.

In other examples, the speed sensor 34 may be configured to sense the actual ground speed of the vehicle 10, as an indication of ground speed (in non-slip and slip conditions). For example, the speed sensor may be a radar device configured to sense an actual ground speed of the work vehicle as the speed parameter. In still yet another example, the speed sensor may be a GPS device (global positioning system device) configured to sense an actual ground speed of the work vehicle as the speed parameter. As in each of the foregoing speed sensor examples, the speed parameter may be an indication of a ground speed of the work vehicle.

According to an operator flow-diversion mode of the vehicle 10, the vehicle 10 has an operator input device 36 configured for manual selection of a diversion setting independent of any seat position of the work vehicle of the vehicle 10. The controller 13 is configured to receive a diversion setting signal indicative of the selected diversion setting, determine a state of the selected diversion setting, and command the diverter 26 to open if the selected diversion setting is in a flow-diversion state.

Figure 2:
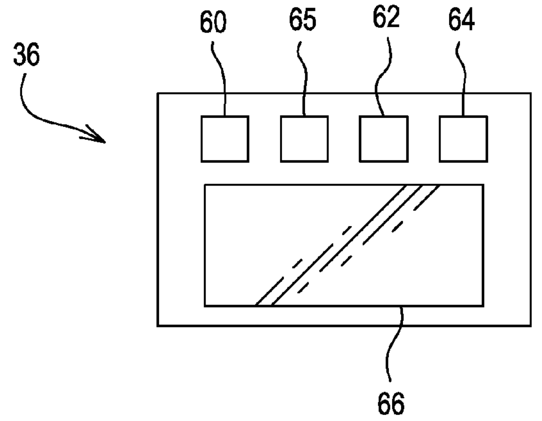
FIG. 2 is a diagrammatic view of a display module for an operator input device.

Referring to FIG. 2, the operator input device 36 is configured for manual selection of the diversion setting independent of any seat position of the work vehicle 10. The operator thus has the option to divert the flow of the second pump at will. The operator may wish to do so, for example, to promote fuel efficiency during idle conditions of the work vehicle 10, whether idling for an extended period of time or otherwise; to exercise relatively fine control of a tool of the work vehicle 10, such as during craning (e.g., when a backhoe section of a backhoe loader may be used to move a pipe around or to move a manhole cover carried by the bucket of the backhoe section) or fine positioning and digging operations (e.g., of a backhoe loader) where full system pump flow is not required; or while transporting at slow speeds to help reduce open-center power losses and reduce fuel consumption. The operator flow-diversion mode reduces the hydraulic power consumed by the vehicle 10 during work and from parasitic losses, improving fuel efficiency of the vehicle 10.

The operator input device 36 may be configured in a wide variety of ways for manual selection of the diversion setting. In the illustrated example of FIG. 2, the operator input device 36 is a display monitor configured for manual selection of the diversion setting. The monitor has a number of buttons to navigate to and select an Economy Mode menu and then select either "ON" corresponding to the flow-diversion state (could also be called "TRANSPORT" or any other suitable name) or "OFF" corresponding to a flow-non-diversion state (could also be called "WORK" or any other suitable name).

The monitor has, for example, a MENU button 60, a NEXT button 62, a SELECT button 64, and a display 66. From a main menu screen on the display 66, the operator presses the MENU button 60 at which point a number of menus are displayed on the display 66. The operator presses the NEXT button 62 successively as needed in order to bring the Settings menu into focus (e.g., highlighted). The operator presses the SELECT button 64 so as to select the Settings menu. When the Settings menu is selected, the Economy Mode menu is displayed on the display 66. Options "OFF" and "ON" are displayed on the display 66 at the Economy Mode menu. The default state of the diversion setting is the OFF or flow-non-diversion state. The operator may press the NEXT button 62 successively as needed to toggle between ON and OFF so as to bring the desired state into focus. Pressing the SELECT button 64 when the ON or flow-diversion state is in focus selects the flow-diversion state, while pressing the SELECT button 64 when the OFF or flow-non-diversion state is in focus selects the flow-non-diversion state. In both cases, the controller 13 receives a diversion setting signal indicative of the selected diversion setting when the SELECT button 64 is pressed at the Economy Mode menu.

The monitor may also have a BACK button 65. Whereas the NEXT button 62 may be used to advance through menu items in one direction, the BACK button 65 may be used to advance through menu items in an opposite direction.

The controller 13 is configured to determine the state of the selected diversion setting. When the operator presses the SELECT button 64 while the ON or flow-diversion state is in focus on the display 66, a diversion setting signal is received from the display monitor by the controller 13, and the controller 13 determines the state of the selected diversion setting to be the flow-diversion state and commands the diverter 26 to open, activating an economy mode. When the operator presses the SELECT button 64 while the OFF or flow-non-diversion state is in focus on the display 66, a diversion setting signal is received from the display monitor by the controller 13, and the controller 13 determines the state of the selected diversion setting to be the flow-non-diversion state and commands the diverter 26 to close, deactivating the economy mode.

The diversion setting signal is indicative of the selected diversion setting. The controller 13 changes the value of an internal variable dependent on which diversion setting is in focus. When the SELECT button 64 is pressed with a particular diversion setting in focus, the diversion setting associated with that value of the internal variable becomes the selected diversion setting. The signal generated upon pressing the SELECT button 64 (i.e., diversion setting signal) effectively tells the controller 13 that the diversion setting in focus is to be the selected diversion setting (the signal itself has the same voltage level regardless of the particular diversion setting that is selected). In this way, the diversion setting signal is indicative of the selected diversion setting. The controller 13 thus determines the state of the selected diversion setting.

Exemplarily, the selected diversion setting is a direct request from the operator, as opposed to a request that may be inferred from, or be a consequence of, some other action, such as, for example, pivoting the operator's seat 80 from a first position to a second position. The work vehicle 10 has an operator's seat 80 at the operator's station of the work vehicle 10, but the selection of the diversion setting is independent of the position of that seat 80 or any other seat of the work vehicle 10.

With respect to selecting the diversion setting, in other examples, the operator input device 36 may have a stand-alone device in addition to the display monitor for navigating through the menu screens and selection choices and selecting the desired setting. The stand-alone device may substitute for one or more of the buttons 60, 62, 64. In yet other examples, the operator input device 36 for manual selection of the diversion setting may include the stand-alone device but not the display monitor. The stand-alone device may take the form of, for example, one or more buttons, a dial, a slide, a rocker, a switch, or the like, and a position sensor, if needed, to sense the position of the stand-alone device. As such, the position sensor may provide different voltage values to the controller 13, each indicative of a diversion setting, dependent on the position of the stand-alone device.

Referring to FIG. 1, according to a start-up flow-diversion mode of the vehicle 10, the vehicle 10 has a start-up sensor 70 positioned to sense start-up of the work vehicle 10 and an engine speed sensor 72 positioned to sense information indicative of a rotational speed of the engine 28 ("engine speed"). The controller 13 is configured to receive a start-up signal indicative of start-up of the work vehicle 10 and an engine speed signal indicative of the engine speed, determine if start-up of the work vehicle 10 has occurred and the engine speed is below an engine speed threshold, and command the diverter 26 to open if start-up of the work vehicle 10 has occurred and the engine speed is below the engine speed threshold. This flow-diversion mode reduces parasitic loads on the engine 28, making it easier to start the engine 28.

The start-up sensor 70 may be a key switch. In such a case, the controller 13 is coupled electrically to the key switch. When the key switch closes, the controller 13 is put in electrical communication with a battery of the vehicle 10, at which point the controller 13 wakes up and determines that start-up of the vehicle 10 has occurred. The key switch closes in response to turning of a physical key. In other examples, the key switch may close in response to pressing of a start-up button or other start-up event.

The engine speed sensor 72 may be an alternator coupled operably to the engine 28. The alternator is driven by a belt between the alternator and an output shaft of the engine 28. The controller 13 is coupled electrically to the alternator to receive an electrical signal therefrom. The alternator has a terminal that generates the signal (e.g., the terminal may be the output of one of the stator windings), which is an alternating current signal (e.g., square wave). The controller 13 determines the engine speed using this signal and geometry relating to the pulley ratio between a drive pulley to which the engine output shaft is coupled and a driven pulley to which the alternator is coupled, the belt trained about those pulleys. The alternator signal may thus be characterized as an engine speed signal. Other engine speed sensors may be used in lieu of the alternator, such as, for example, an engine crankshaft speed sensor.

The engine speed threshold is a non-zero value below engine idle speed, but high enough for the controller 13 to confirm that the engine 28 is operating. In an application of a backhoe loader, the engine speed threshold may be, for example, 600 revolutions per minute ("rpm"), and the engine idle speed may be, for example, 875 rpm (+/−25 rpm).

In the illustrated example, the controller 13 is an electronic controller. As such, the controller 13 is coupled electrically to the speed sensor 34, the operator input device 36, the start-up sensor 70, and the engine speed sensor 72, and the diverter 24. The controller 13 has a processor and memory having instructions stored therein which, when executed by the processor, cause the processor to perform its various operations. In the illustrated example, the controller 13 is the only electronic controller involved in diverting flow from the second pump 20 (it may also be the only electronic controller of the vehicle 10).

In other examples, the controller 13 may be one of a network of electronic controllers coupled to one another by, for example, a CAN bus ("CAN" means controller area network). In such a case, the speed parameter, the selected diversion setting, information about vehicle start-up, and the engine speed may be inputted into the controller directly, or indirectly via one or more other controllers that broadcast on the CAN bus corresponding message(s) indicative of the speed parameter and/or the selected diversion setting and received by the controller 13 having control of the diverter 26. Regardless whether the controller 13 receives those inputs directly or indirectly, the controller 13 is electrically coupled to the speed sensor 34, the operator input device 36, the start-up sensor 70, and the engine speed sensor 72, and the diverter 24.

Figure 3:
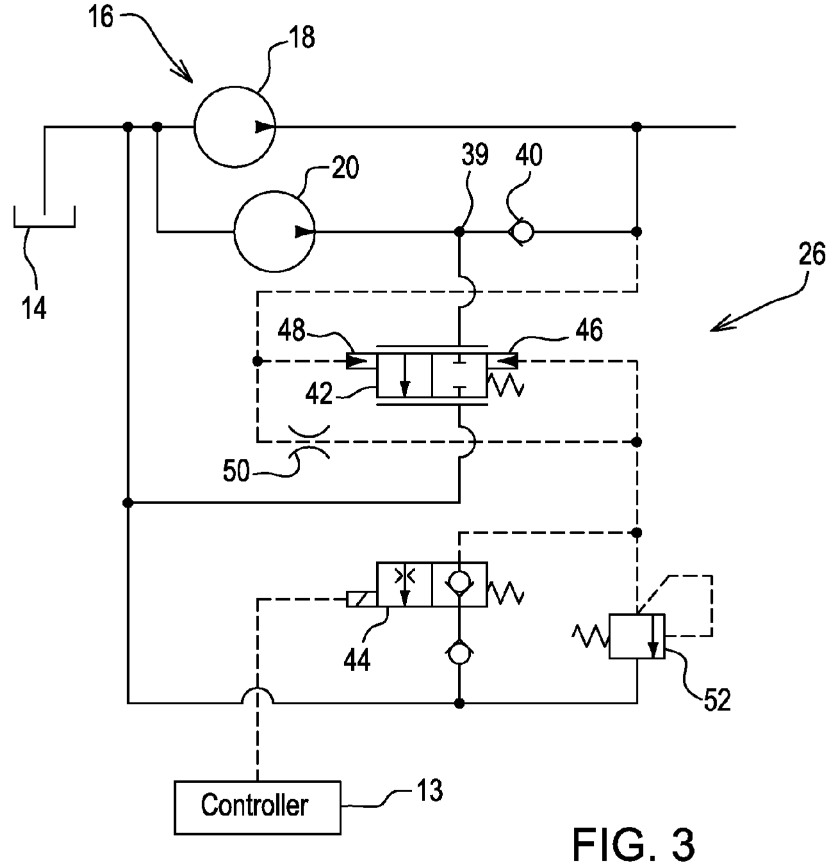
FIG. 3 is a schematic view showing an electro-hydraulic diverter for a pump of a pump group of the work vehicle.

Referring to FIG. 3, the diverter 26 is coupled fluidly to a point 39 between the second pump 20 and the directional control valve 24 and to the fluid reservoir 14 to divert flow from the second pump 20 to the fluid reservoir 14 when the diverter 26 is opened. The pumps 18, 20 are fluid-parallel to one another, with the first pump 18 in a first line of the parallel arrangement, and the second pump 20 in a second line of the parallel arrangement. The point 39 is in the second line of the parallel arrangement downstream from the second pump 20, and exemplarily upstream from a check-valve 40.

The diverter 26 has a pilot-actuated unloader valve 42 and an electro-hydraulic pilot valve 44. The unloader valve 42 is spring-biased to a closed position blocking fluid communication between the point 39 and the reservoir 14 via the diverter 26. Illustratively, the unloader valve 42 is a proportional valve, although it could be an on/off valve. The unloader valve 42 has a first pilot port 46 and a second pilot port 48. The pilot ports 46, 48 are coupled fluidly to the second line of the parallel arrangement downstream from the check valve 40, the first pilot port 46 so coupled via an orifice 50. The pilot valve 44 is coupled fluidly to the first pilot port 46 and to the second pilot port 48 via the orifice 50, and is spring-biased to a closed position blocking fluid communication between the pilot ports 46, 48 and the reservoir 14.

The controller 13 is coupled electrically to the pilot valve 44. The controller commands the diverter 26 to open by outputting a control signal to the pilot valve 44, energizing its solenoid. Such energization shifts the pilot valve 44 (e.g., its spool when the valve 44 is a spool-type valve) from its normally closed position to an opened position, venting the first pilot port 46 to the reservoir 14 so as to create a pressure imbalance between the pilot ports 46, 48 due to the orifice 50. As a result, the unloader valve 42 shifts from its normally closed position to an opened position, diverting flow from the second pump 20 through the unloader valve 42 to the reservoir 14.

The diverter 26 has a relief valve 52. The relief valve 52 is spring-biased to a closed position, and is configured to open if the supply pressure in the second line of the parallel arrangement is at least a predetermined pressure-relief threshold. The predetermined pressure-relief threshold may be reached during operations involving relatively high pressure where the flow from the second pump 20 may not be needed (e.g., digging a trench by the backhoe section of a backhoe loader or digging in a pile by the loader section of the backhoe loader). The relief valve 52 vents the first pilot port 46 to the reservoir 14 so as to create a pressure imbalance between the pilot ports 46, 48 due to the orifice 50 in order to cause the unloader valve 42 to shift from its normally closed position to its opened position, diverting flow from the second pump 20 through the unloader valve 42 to the reservoir 14.

Figure 4:
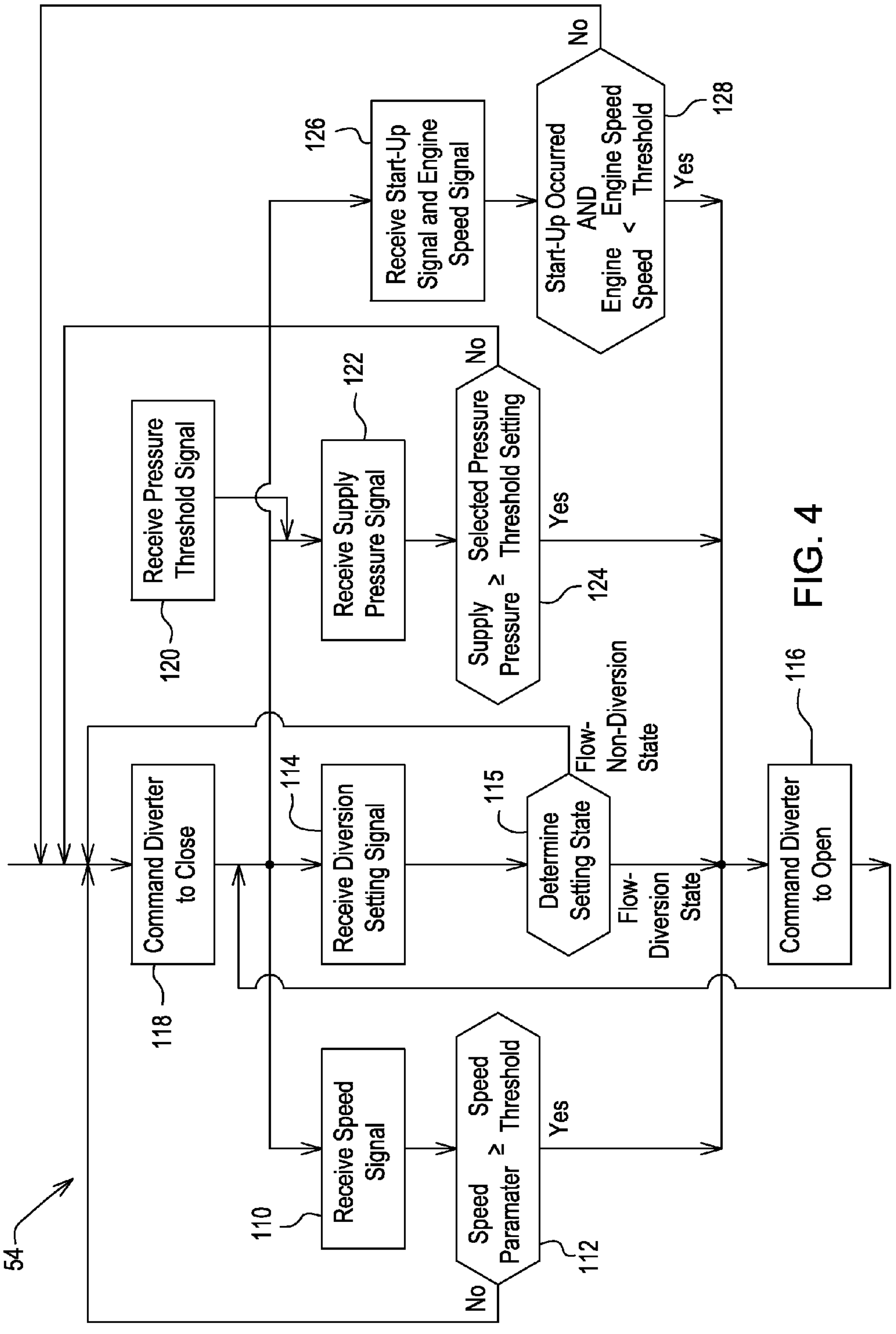
FIG. 4 is a block diagram of a control routine.

Referring to FIG. 4, the controller 13 has a control routine 54 to control the diverter 26. With respect to the speed flow-diversion mode, in act 110, the controller 13 receives the speed signal. The control routine 54 advances to act 112. In act 112, the controller 13 determines if the speed parameter is at least a speed threshold (e.g., 12.9 kilometers per hour). If yes, the control routine 54 advances to act 116. In act 116, the controller 13 commands the diverter 26 to open by outputting a control signal to the pilot valve 44 so as to energize its solenoid. If no, the control routine 54 advances to act 118. In act 118, the controller 13 commands the diverter 26 to close by not outputting a control signal to the pilot valve 44, allowing the pilot valve 44 and the unloader valve 42 to assume their normal, spring-biased closed positions. Once the diverter 26 has been commanded to open, the Hysteresis is included in the control routine 54 to avoid rapidly turning the diverter 26 on and off due to small fluctuations in the speed parameter, such that, once the diverter 26 has been commanded to open, the speed threshold is lowered from the initial speed threshold (e.g., 12 kph for a backhoe loader application) to a second speed threshold (e.g., 11.2 kph for the backhoe loader application).

With respect to the operator flow-diversion mode, in act 114, the controller 13 receives the diversion setting signal. The control routine 54 advances to act 115. In act 115, the controller 13 determines the state of the selected diversion setting. The controller 13 stores the state of the selected diversion setting in its memory (i.e., flow-diversion state or flow-non-diversion state) in response to the diversion setting signal due to selection of the diversion setting by the operator via the operator input device 36. If the controller 13 determines that the state of the selected diversion setting is the flow-diversion state, the control routine 54 advances to act 116, where the controller 13 commands the diverter 26 to open by outputting a control signal to the pilot valve 44 so as to energize its solenoid. If the controller 13 determines that the state of the selected diversion setting is the flow-non-diversion state, the control routine 54 advances to act 118, where the controller 13 commands the diverter 26 to close by not outputting a control signal to the pilot valve 44, allowing the pilot valve 44 and the unloader valve 42 to assume their normal, spring-biased closed positions.

With respect to the start-up flow-diversion mode, in act 126, the controller 13 receives the start-up signal and the engine speed signal. The control routine 54 advances to act 128. In act 128, the controller 13 determines if start-up of the work vehicle 10 has occurred and the engine speed is below an engine speed threshold. If both of those conditions are met, control routine 54 advances to act 116, where the controller 13 commands the diverter 26 to open by outputting a control signal to the pilot valve 44 so as to energize its solenoid. If both conditions are not met, the control routine 54 advances to act 118, where the controller 13 commands the diverter 26 to close by not outputting a control signal to the pilot valve 44, allowing the pilot valve 44 and the unloader valve 42 to assume their normal, spring-biased closed positions.

Referring to FIG. 1, in another example of the work vehicle 10, the work vehicle 10 has a pressure sensor 68 positioned to sense a supply pressure in the hydraulic system 12, such as, for example, at the supply inlet port of the directional control valve 24. The operator input device 36 is configured for manual selection of a pressure threshold setting. The controller 13 is configured to receive a supply pressure signal indicative of the supply pressure and a pressure threshold signal indicative of the selected pressure threshold, determine if the supply pressure is at least the selected pressure threshold, and, if so, command the diverter 26 to open. In the case where the vehicle 10 would have the pressure sensor 68, the diverter 26 would be configured without the pressure-relief valve 52, avoiding the cost of the pressure-relief valve 52. This is a pressure flow-diversion mode.

An operator may select the pressure threshold setting as desired. A lower pressure threshold setting may tend to promote fuel efficiency over productivity, whereas a higher pressure threshold setting may tend to promote productivity over fuel efficiency. The operator may thus control the balance between fuel efficiency and productivity based, for example, on operational goals or market considerations (e.g., North America may tend to emphasize productivity while other regions such as, for example, India may tend to emphasize fuel efficiency).

Referring to FIG. 2, the operator input device 36 (or other operator input device) may be configured in a wide variety of ways for manual selection of the pressure threshold setting from a range of selectable values. The operator input device 36 may comprise a display monitor, which may be configured for manual selection of the pressure threshold setting. In such a case, the buttons 60, 62, 64 may be used to select the desired pressure threshold setting. From the main menu screen on the display 66, the operator presses the MENU button 60 at which point a number of menus are displayed on the display 66. The operator presses the NEXT button 62 successively, as needed, in order to bring a Pressure menu into focus. The operator presses the SELECT button 64 so as to select the Pressure menu. When the Pressure menu is selected, the Pressure menu is displayed on the display 66. A list of possible settings for the pressure threshold setting is displayed on the display 66. The operator may press the NEXT button 62 successively, as needed, to scroll through the list of possible settings so as to bring the desired setting into focus (with wrapping from the end of the list to the beginning of the list). Alternatively, instead of listing all the possible settings, only the setting in focus may be displayed at a given time, with successive presses of the NEXT button 62 causing successive possible settings to be displayed alone on the display 66 and to be in focus, potentially allowing for more pressure threshold setting choices than with a displayed list (the NEXT button 62 may increment the setting on display and in focus by a predetermined amount, and the BACK button 65 may decrement that setting by the predetermined amount). Regardless of the manner of display, pressing the SELECT button 64 when the desired setting is in focus selects that setting as the selected pressure threshold setting. The controller 13 receives a pressure threshold signal indicative of the selected pressure threshold setting.

As alluded to above, the monitor may also have a BACK button 65. Whereas the NEXT button 62 may be used to advance through menu items in one direction, the BACK button 65 may be used to advance through menu items in an opposite direction.

The controller 13 is configured to determine the state of the selected pressure threshold setting. When the operator presses the SELECT button 64 while a particular setting is in focus on the display 66, the pressure threshold signal is received by the controller 13, and the controller 13 determines the state of the selected pressure threshold setting to be the setting in focus.

The pressure threshold signal is indicative of the selected pressure threshold setting. The controller 13 changes the value of an internal variable dependent on which pressure threshold setting is in focus. When the SELECT button 64 is pressed with a particular pressure threshold setting in focus, the pressure threshold setting associated with that value of the internal variable becomes the selected pressure threshold setting. The signal generated upon pressing the SELECT button 64 (i.e., pressure threshold setting signal) effectively tells the controller 13 that the pressure threshold setting in focus is to be the selected pressure threshold setting (the signal itself has the same voltage level regardless of the particular pressure threshold setting that is selected). In this way, the pressure threshold setting signal is indicative of the selected pressure threshold setting. The controller 13 thus determines the state of the selected pressure threshold setting.

The control routine 54 of the controller 13 may thus be configured to activate or deactivate the diverter 26 dependent on the supply pressure and the selected pressure threshold setting. In such a case, in act 120, the controller 13 receives the pressure threshold signal indicative of the selected pressure threshold setting in response to selection of a pressure threshold setting by the operator. In act 122, the controller 13 receives a supply pressure signal indicative of the supply pressure sensed by the pressure sensor 68. The control routine 54 advances to act 124, where the controller 13 determines if the supply pressure is at least the selected pressure threshold setting, and, if so, commands the diverter 26 to open by outputting a control signal to the pilot valve 44, energizing its solenoid. If the supply pressure is below the selected pressure threshold setting as determined by the controller 13, the controller 13 commands the diverter 26 to close by not outputting the control signal to the pilot valve 44.

In other examples, the operator input device 36 may have a stand-alone device in addition to the display monitor for navigating through the menu screens and selection choices and selecting the desired setting. The stand-alone device may substitute for one or more of the buttons 60, 62, 64. In yet other examples, the operator input device 36 for manual selection of the pressure threshold setting may include the stand-alone device but not the display monitor. Such a stand-alone device may take the form of, for example, one or more buttons, a dial, a slide, a rocker, a switch, or the like, and a position sensor, if needed, to sense the position of the stand-alone device. As such, the position sensor may provide different voltage values to the controller 13, each indicative of a pressure threshold setting, dependent on the position of the stand-alone device.

In the absence of activation of a flow-diversion mode, the flows from the pumps 18, 20 combine and are supplied to the DCV(s) 24. With respect to the pressure flow-diversion mode, during operations such as digging a trench by the backhoe section of a backhoe loader, the operator needs high pressure, but does not require full flow while making a cut and filling the bucket. During this operation the flow from the second pump 20 is diverted by the diverter 26 to the fluid reservoir 14, thereby applying the flow from only the pump 18 to the high pressure dig operation. The operator should not notice a reduction in function speed while digging at high pressure. As soon as the pressure drops below the selected pressure threshold setting, flow from the second pump 20 is allowed to re-combine with the flow from the first pump 18 to keep function speed at the desired level.

The work vehicle 10 may have any one or more of the four flow-diversion modes disclosed herein. It may have only one of the flow-diversion modes, or any combination of two or more of the flow-diversion modes.

The work vehicle 10 may be any type of work vehicle. For example, it may be a construction vehicle, an agricultural vehicle, or a forestry vehicle, to name but a few. Exemplarily, the work vehicle 10 is a backhoe loader. In such a case, the work vehicle 10 has a tractor, a backhoe section 37 coupled to the rear of the tractor, and a loader section 38 coupled to the front of the tractor.

The backhoe section 37 has a number of functions 32, such as, for example, a swing frame coupled pivotally, and, in some examples, slidably to the tractor, a boom coupled pivotally to the swing frame, a crowd arm coupled pivotally to the boom, and a bucket coupled pivotally to the crowd arm. The backhoe section 37 has a number of actuators 22 to operate those backhoe functions 32, such as, for example, two swing cylinders, a boom cylinder, a crowd cylinder, and a bucket cylinder. In some examples, the backhoe section 37 also has four sideshift locking cylinders for locking the swing frame and the members coupled thereto (i.e., the boom, crowd arm and bucket) in a lateral position relative to the tractor.

The loader section 38 has a number of functions 32, such as, for example, a boom coupled pivotally to the tractor and a bucket coupled pivotally to the boom. The loader section 38 has a number of actuators 22 to operate those loader functions 32, such as, for example, two boom cylinders and a bucket cylinder. It should be understood from the foregoing that, although the backhoe section 37 and the loader section 38 are shown in block 32 of FIG. 1, each section 37, 38 includes not only functions 32 of the vehicle 10 but also actuators 22 of the vehicle 22 and various connecting elements.

Additional functions 32 of the backhoe loader may include steering and two stabilizer arms coupled pivotally to opposite sides of the vehicle. Actuators 22 to operate those functions include a steering motor and two stabilizer cylinders.

The backhoe loader may have one or more open-center directional control valves 24 ("DCV" means directional control valve). Exemplarily, it has an open-center DCV for the backhoe section and an open-center DCV for the loader section, each such DCV being a valve bank with plural sections in a common housing.

The backhoe DCV has plural spools respectively for various backhoe functions 32 (i.e., swing, boom, bucket, crowd) as well as an open-center spool in a priority valve section of the backhoe DCV which gives flow-priority to a steering valve in response to a load-sense pressure due to manual steering of the steering valve.

Steering priority could also be performed by sending pump flow from the first pump 18 to the steering valve through a stand-alone priority valve or a priority valve mounted to the steering unit. In either case, the priority valve would be located before any of the DCV's 24 in the open-center path of the hydraulic system 12.

The backhoe DCV may also have a path supplying hydraulic fluid through a spring-biased check valve to the four sideshift locking cylinders which lock the swing frame and the members coupled thereto in a lateral position relative to the tractor when an on/off electro-hydraulic valve under the control of the controller 13 is in its normally closed position. The controller 13 can energize that on/off valve to shift it to its opened position, venting the four sideshift locking cylinders to the reservoir 14 so as to release them, allowing manual sideshifting of the swing frame and the members coupled thereto or gravitational sideshifting of the swing frame and the members coupled thereto upon a partial raising of the one of the stabilizer arms, after which the on/off valve can be de-energized, re-locking the four sideshift locking cylinders and thus the swing frame and the members coupled thereto in the new lateral position.

The loader DCV has plural spools respectively for the various loader functions 32 (i.e., boom and bucket). In addition, it has two open-center spools each respectively for one of the two stabilizer arms.

The diverter 26 may be built into the second pump 20, the backhoe DCV, the loader DCV, or as a stand-alone valve.

In a first example of the backhoe loader, the backhoe loader may have the speed flow-diversion mode, the operator flow-diversion mode, and the start-up flow-diversion mode, but, for cost reasons, may not have the pressure flow-diversion mode. Inclusion of the speed flow-diversion mode (e.g., with speed threshold of 12.9 kilometers per hour) is considered to be especially useful in regions where backhoe loader transporting is common (e.g., India), although it would be applicable in any region. In such a backhoe loader, the controller 13 may be the sole electronic controller of the vehicle, in which case the speed parameter, the selected diversion setting, the start-up notification, and the engine speed may be inputted directly to the controller 13, and the diverter 26 may be under the control of the controller 13.

In a second example of the backhoe loader, the backhoe loader may have all four flow-diversion modes (perhaps without the sideshift function, although the sideshift function could be included as well). In such a backhoe loader, the backhoe loader may have any number of controllers involved with those modes, such as three controllers: a first controller, a second controller, and a third controller (i.e., controller 13). The first controller may be coupled electrically to the speed sensor 34 which inputs the speed parameter to the first controller via a speed signal indicative of the speed parameter, and the first controller may broadcast on the CAN bus a speed message (itself a speed signal indicative of the speed parameter) received by the third controller. The first controller may be coupled electrically to the start-up sensor 70 which inputs a start-up notification to the first controller via a start-up signal to the first controller, and the first controller may broadcast on the CAN bus a start-up message (itself a start-up signal indicative of start-up of the work vehicle) received by the third controller. The first controller may be coupled electrically to the engine speed sensor 72 which inputs the engine speed to the first controller via an engine speed signal indicative of the engine speed, and the first controller may broadcast on the CAN bus an engine speed message (itself an engine speed signal indicative of the engine speed) received by the third controller (alternatively, there may be a fourth controller—an engine control unit—to which the engine speed is inputted by the engine speed sensor and which broadcasts the engine speed message on the CAN bus).

The second controller may be coupled electrically to the operator input device 36 which may input the selected diversion setting to the second controller via a diversion setting signal indicative of the selected diversion setting and the selected pressure threshold setting to the second controller via a pressure threshold signal indicative of the selected pressure threshold setting. The second controller may broadcast on the CAN bus a diversion setting message (itself a diversion setting signal indicative of the selected diversion setting) and a pressure threshold setting message (itself a pressure threshold signal indicative of the selected pressure threshold setting), both messages received by the third controller.

The third controller may be coupled electrically to the pressure sensor 68 and the diverter 26. The pressure sensor 68 may input the supply pressure to the third controller via a supply pressure signal indicative of the supply pressure. Having received the thus-described information, the third controller controls the diverter 26 accordingly.

The controller 13 may be coupled electrically to the speed sensor 34, the start-up sensor 70, the engine speed sensor 72, the operator input device 36, the pressure sensor 68, and the diverter 26 directly or indirectly. Further, the vehicle 10 may have any number of controllers—whether one or more—involved in flow diversion, regardless of which flow-diversion modes are employed on the vehicle 10.

When any of the flow-diversions is activated, all the flow from the second pump 20 is routed to the reservoir 14. In other examples, the diverter 26 may be configured to divert only a portion of the flow of the second pump 20 to the reservoir, to achieve more precision in the use of a given flow-diversion mode.

The pressure flow-diversion may be modified. For example, in the absence of a pressure threshold setting selection by an operator, a the controller 13 may select a default pressure threshold setting as the selected pressure threshold setting, the default pressure threshold setting being a value pre-programmed into the software (e.g., in the manufacturing process). In other examples, the vehicle 10 may be configured without operator selectability of the pressure threshold setting, in which case a pressure threshold setting would be pre-programmed into the software (e.g., in the manufacturing process). In general, with respect to providing flow diversion in response to pressure, the pressure sensor 68 may be used instead of the pressure-relief valve 52 (e.g., on the second example of the backhoe loader).

It is to be understood that a “signal” herein may be a single signal or a group of signals, depending on the type of sensor employed.

As alluded to above, the speed sensor 34 may be configured in a wide variety of ways. Referring to FIG. 1, in another example, the speed sensor 34 is configured as a gear ratio sensor 76 configured to sense a gear ratio selected by a gear ratio selector 74 of the vehicle 10 (as the speed parameter). The gear ratio selector 74 is configured for selection of the gear ratio. The controller 13 is configured to receive a gear ratio signal (as the speed signal) indicative of the selected gear ratio, determine if the selected gear ratio is at least a gear ratio threshold (as the predetermined speed criteria), and command the diverter 26 to open if the selected gear ratio is at least the predetermined gear ratio (e.g., third or fourth gear in the forward direction among four forward gears in an application of a backhoe loader). In this example, the selected gear ratio provides an indication of speed in that, during transporting of the vehicle 10, the selected gear ratio is likely to be one of the higher gear ratios.

In another example of the speed flow-diversion mode, the vehicle 10 may have the gear ratio selector 74, the gear ratio sensor 76, and the speed sensor 34 in the form of a ground speed sensor configured to sense an indication of a ground speed of the vehicle 10 (as the speed parameter). According to this example, the controller 13 is configured to receive a speed signal indicative of the ground speed and a gear ratio signal indicative of the selected gear ratio, determine if the ground speed is at least a speed threshold (e.g., 12.9 kph in an application of a backhoe loader) and the selected gear ratio is at least a gear ratio threshold (e.g., third or fourth gear in the forward direction among four forward gears in the application of the backhoe loader), and command the diverter 26 to open if the ground speed is at least the speed threshold and the selected gear ratio is at least the gear ratio threshold. The controller 13 is configured to command the diverter 26 to close if either condition is not met, such as, for example, if the ground speed is at least the speed threshold but the selected gear ratio is below the gear ratio threshold. In this way, the flow from both pumps will still be available for function operation and productivity.

Figure 5:
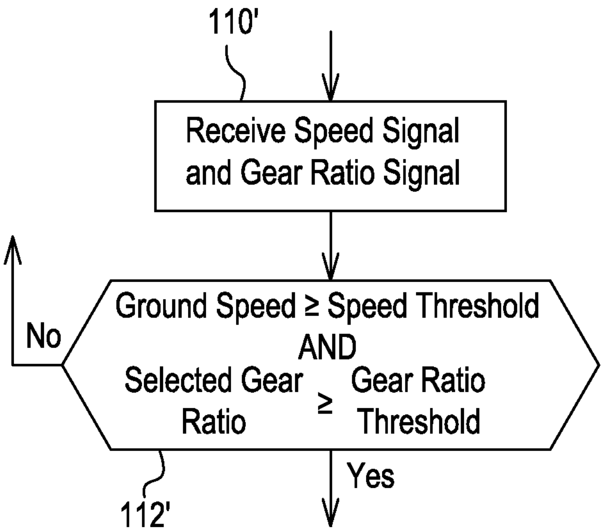
FIG. 5 is a block diagram showing an alternative embodiment for a portion of the control routine.

Referring to FIG. 5, according to this example, the acts 110 and 112 of the control routine 54 may be modified respectively by acts 110' and 112'. In act 110', the controller 13 receives the speed signal indicative of the ground speed and the gear ratio signal indicative of the selected gear ratio. The control routine 54 advances to act 112' in which the controller 13 determines if the ground speed is at least the speed threshold and the selected gear ratio is at least a gear ratio threshold. If yes, the control routine advances to act 116 in which the controller 13 commands the diverter 26 to open. If no, the control routine 54 advances to act 118 in which the controller 13 commands the diverter 26 to close.

Such a system may be useful if the flow of both pumps 18, 20 is desirable for one or more functions 32 while the vehicle 10 is transporting. It can be assumed that the flow of both pumps 18, 20 is desirable when, for example, the gear ratio is below the gear ratio threshold. For example, a snow pusher may be coupled to the loader boom. During a snow pushing operation, one of the lower gear ratios may be selected (e.g., first or second gear in the forward direction) for torque, but the vehicle 10 may be at a transport speed. In such a situation, the operator may wish to raise the snow pusher quickly as part of the snow-pushing operation. The flow from both pumps 18, 20 will be available to so raise the snow pusher. If the flow from Only the first pump 18 were available, the vehicle 10 may be unable to raise the snow pusher as quickly as desired.

As alluded to above, the speed sensor 34 may be configured to sense the ground speed of the work vehicle 10 in a wide variety of ways, and, as such, may be referred to as a ground speed sensor. The ground speed sensor may be configured as a transmission speed sensor, engine speed sensor, wheel speed sensor or other ground-engaging element speed sensor, final drive speed sensor, radar, or GPS-based speed sensor, to name but a few examples.

The gear ratio selector 72 may be configured in a wide variety of ways. For example, the gear ratio selector is configured as an FNR lever at the operator's station. The lever is pivotable about an axis from a neutral or "N" position in a forward direction to a forward or "F" position or in a reverse direction to a reverse or "R" position in order to select vehicle direction. The lever is rotatable about an axis defined by the lever between a number of discrete angular positions corresponding respectively to directionless gear ratios.

The gear ratio sensor 76 may include a first sensor configured to sense the FNR position of the lever (i.e., whether in forward, neutral, or reverse position) and a second position sensor configured to sense the angular position of the lever. The first position sensor generates a first position signal (e.g., a voltage signal), and the second position sensor generates a second position signal (e.g. a voltage signal). Each of the position sensors may include a series of contact-type switches, a series of FET switches ("FET" means field-effect transistor), or other suitable position-sensing technology.

The position signals constitute the gear ratio signal indicative of the selected gear ratio, and are received directly or indirectly by the controller 13, which uses them to determine whether to open or close the diverter 26. In the case where the vehicle 10 has a single controller 13 responsible for the speed flow-diversion mode, the controller 13 receives those signals directly. In the case where the vehicle 10 has multiple controllers for the speed flow-diversion mode, they may be received directly by another controller (e.g., the first controller in the example above with three controllers) which broadcasts corresponding messages on the CAN bus received by the third controller (i.e., controller 13) for control of the diverter 26. Instead of broadcasting two messages, the first controller may broadcast one message on the CAN bus, that one message containing both the FNR direction information and directionless gear ratio information so as to constitute a gear ratio signal received by the third controller for control of the diverter 26, or that one message may contain only the directionless gear ratio information.

Flow diversion activation may or may not depend on direction, i.e., whether forward, neutral, or reverse has been selected. Exemplarily, as alluded to above, flow diversion is activated only if the selected gear ratio is forward third or fourth gear ratio, and, as such, is FNR or direction dependent. In other words, flow diversion is not activated if the selected gear ratio is reverse or neutral, in which case the selected gear ratio and the gear ratio threshold has a direction component and a gear ratio component. The vehicle 10 may operate in reverse at the higher gear ratios for only brief periods of time (e.g., reverse third gear ratio in backhoe loader application having three reverse gear ratios), in which case fuel efficiency may be only minimally affected if flow diversion were to be activated at those times.

In other examples, flow diversion activation may be independent of whether forward or reverse has been selected. In other words, flow diversion may be activated in both forward and reverse directions. However, flow diversion would still not activate in neutral. In such a case, the selected gear ratio and the gear ratio threshold may have a direction component and a gear ratio component.

In yet other examples, flow diversion activation may be wholly direction independent. In other words, the selected gear ratio and the gear ratio threshold may have a gear ratio component but not a direction component, since ground speed would also be taken into account before activating the speed flow-diversion mode.

With respect to the pressure flow-diversion mode, plural pressure threshold settings may be selected respectively for different implement sections of the work vehicle 10. For example, in the context of a backhoe loader, there may be a first pressure threshold setting for the backhoe section 37 (e.g., for digging a trench), and a second pressure threshold setting for the loader section 38 (e.g., for digging into a pile), which may be the same as or different from the first pressure threshold setting. Either setting may be operator selectable according to the process disclosed herein for selecting a pressure threshold setting. If both are operator selectable there may be a backhoe pressure menu and a loader pressure menu, either of which may be selected for display on a display monitor of the operator input device 36 in order to input the pressure threshold setting for the respective section. As such, the controller 13 may be configured to receive a first pressure threshold signal indicative of the first pressure threshold setting and a second pressure threshold signal indicative of the second pressure threshold setting, and may store those settings in its memory. Alternatively, either setting may be pre-programmed into the software (e.g., during the manufacturing process). If either setting is operator selectable, a default setting may be pre-programmed into the software in case the operator chooses not to select a setting.

The vehicle 10 may have a section sensor 78 configured to sense which of the backhoe section 37 (or, more generally, a first implement section) and the loader section 38 (or, more generally, a second implement section) is in focus (e.g., enabled or otherwise the section to be operated). The vehicle 10 may have an operator's seat 80 positionable in a backhoe position facing the backhoe section 37 and an opposite loader position facing the loader section 38. The section sensor 78 is, for example, a seat position sensor configured to sense in which of the backhoe position and the loader position is the operator's seat 80 positioned. To determine the seat position, the sensor may be a switch (e.g., in the first example of the backhoe loader), a rotary position sensor (e.g., in the second example of the backhoe loader), a Hall-effect sensor, or a potentiometer, to name but a few examples. In other examples, the section sensor 78 may be an operator input control (e.g., via a display monitor of the operator input device 36) by which the operator can select which section is to be in focus.

The controller 13 may be coupled electrically to the section sensor 78, configured to receive a section signal indicative of which of the backhoe section 37 and the loader section 38 is in focus, determine which of the backhoe section 37 and the loader section 38 is in focus, and select the first pressure threshold setting as a selected pressure threshold setting if the backhoe section 37 is in focus or the second pressure threshold setting as the selected pressure threshold setting if the loader section 38 is in focus.

Figure 6:
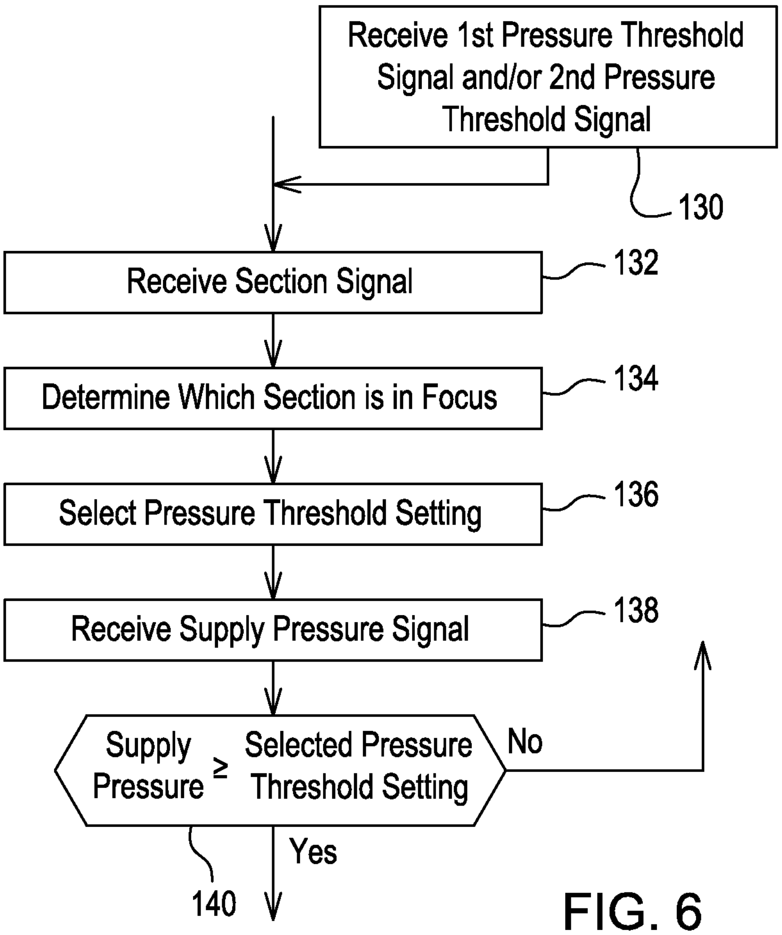
FIG. 6 is a block diagram showing an alternative embodiment for a portion of the control routine.

Referring to FIG. 6, according to a variation of the control routine 54, in act 130, the controller 13 receives a first pressure threshold setting signal indicative of the first pressure threshold setting and/or a second pressure threshold setting signal indicative of the second pressure threshold setting, if such setting(s) are operator selectable. In act 132, the controller 13 receives a section signal indicative of which of the backhoe section 37 and the loader section 38 is in focus. In act 134, the controller 13 determines which of the backhoe section 37 and the loader section 38 is in focus. In act 136, the controller 13 selects the first pressure threshold setting as a selected pressure threshold setting if the backhoe section 37 is in focus or the second pressure threshold setting as the selected pressure threshold setting if the loader section 38 is in focus. In act 138, the controller 13 receives the supply pressure signal indicative of the supply pressure. In act 140, the controller 13 determines if the supply pressure is at least the selected pressure threshold setting. If yes, the control routine 54 advances to act 116 in which the controller 13 commands the diverter 26 to open. If no, the control routine advances to act 118 in which the controller 13 commands the diverter 26 to close.

With respect to this mode of flow diversion, the controller 13 may receive the aforementioned signals directly or indirectly (i.e., the section signal, the supply pressure signal, and, in the case of operator selectability, the first pressure threshold signal and/or the second pressure threshold signal). In the case where the vehicle 10 has multiple controllers, they may be received directly by another controller (e.g., the first controller in the example above with three controllers) which broadcasts corresponding messages on the CAN bus received by the third controller (i.e., controller 13) for control of the diverter 26. The supply pressure signal may be received and forwarded to the (third) controller 13 as disclosed above, and the first and second pressure threshold signals may be received and forwarded to the (third) controller 13 as with the pressure threshold signal disclosed above. The section signal may be received by the first controller which may broadcast a message on the CAN bus indicative of which of the backhoe section 37 and the loader section 38 is in focus (itself a section signal indicative of which of the backhoe section 37 and the loader section 38 is in focus). The (third) controller 13 may receive that message and control the diverter 26 accordingly.

This mode of flow diversion (i.e., "pressure flow-diversion mode") may be used with any work vehicle having plural implement sections, each implement section having one or more functions of the vehicle 10. The backhoe loader is but one type of vehicle with which this mode of flow diversion may be used. As such, the vehicle 10 may have only one directional control valve for the implement sections or plural directional control valves each dedicated to a respective one of the implement sections or serving one or more functions of more than one of the implement sections.

The reference to CAN herein is but one example of a suitable communication protocol for a controller network. Other communication protocols could be used, such as, for example, LIN, Ethernet, etc.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work vehicle comprising
a fluid reservoir,
a pump group comprising a fixed-displacement first pump and a fixed-displacement second pump such that the first and second pumps are flow-parallel to one another,
an actuator,
an open-center directional control valve positioned fluidly between the pump group and the actuator,
an electro-hydraulic diverter coupled fluidly to a point between the second pump and the directional control valve and to the fluid reservoir to divert flow from the second pump to the fluid reservoir when the diverter is opened,
a speed sensor positioned to sense a speed parameter of the work vehicle or an operator input device configured for manual selection of a diversion setting independent of any seat position of the work vehicle, and
a controller configured to
receive a speed signal indicative of the speed parameter or a diversion setting signal indicative of the selected diversion setting,
determine if the speed parameter satisfies predetermined speed criteria or determine a state of the selected diversion setting, and
command the diverter to open if the speed parameter satisfies the predetermined speed criteria or if the selected diversion setting is in a flow-diversion state.

2. The work vehicle of claim 1, comprising the speed sensor positioned to sense the speed parameter, wherein the controller is configured to receive the speed signal indicative of the speed parameter, determine if the speed parameter satisfies predetermined speed criteria, and, if so, command the diverter to open.

3. The work vehicle of claim 2, wherein the speed parameter is an indication of a ground speed of the work vehicle.

4. The work vehicle of claim 2, wherein the controller is configured to determine if the speed parameter is at least a speed threshold, and, if so, command the diverter to open.

5. The work vehicle of claim 2, comprising a gear ratio selector and a gear ratio sensor configured to sense a gear ratio selected by the gear ratio selector, and the controller is configured to receive the speed signal indicative of a ground speed of the work vehicle as the speed parameter and a gear ratio signal indicative of the selected gear ratio, determine if the ground speed is at least a speed threshold and the selected gear ratio is at least a gear ratio threshold, and command the diverter to open if the ground speed is at least the speed threshold and the selected gear ratio is at least the gear ratio threshold.

6. The work vehicle of claim 5, wherein the controller is configured to command the diverter to close if the ground speed is at least the speed threshold but the selected gear ratio is below the gear ratio threshold.

7. The work vehicle of claim 1, comprising the operator input device configured for manual selection of the diversion setting independent of any seat position of the work vehicle, wherein the controller is configured to receive the diversion setting signal indicative of the selected diversion setting, determine the state of the selected diversion setting, and command the diverter to open if the selected diversion setting is in the flow-diversion state.

8. The work vehicle of claim 7, wherein the operator input device comprises a display monitor configured for manual selection of the diversion setting.

9. The work vehicle of claim 7, wherein the operator diversion request is a direct request from the operator.

10. The work vehicle of claim 7, wherein the controller is configured to command the diverter to close if the selected diversion setting is in a flow-non-diversion state.

11. The work vehicle of claim 1, wherein the work vehicle is a backhoe loader comprising a backhoe mode to operate a backhoe section of the backhoe loader and a loader mode to operate a loader section of the backhoe loader, and the controller is configured to command the diverter to open in each of the loader mode and the backhoe mode if the selected diversion setting is in the flow-diversion state.

12. A work vehicle comprising
a hydraulic system comprising
a fluid reservoir,
a pump group comprising a fixed-displacement first pump and a fixed-displacement second pump such that the first and second pumps are flow-parallel to one another,
an actuator,
an open-center directional control valve positioned fluidly between the pump group and the actuator,
an electro-hydraulic diverter coupled fluidly to a point between the second pump and the directional control valve and to the fluid reservoir to divert flow from the second pump to the fluid reservoir when the diverter is opened, and
a pressure sensor positioned to sense a supply pressure in the hydraulic system,
an operator input device configured for manual selection of a pressure threshold setting, and
a controller configured to
receive a supply pressure signal indicative of the supply pressure and a pressure threshold signal indicative of the selected pressure threshold setting,
determine if the supply pressure is at least the selected pressure threshold setting, and
if so, command the diverter to open.

13. The work vehicle of claim 12, wherein the operator input device comprises a display monitor configured for manual selection of the pressure threshold setting.

14. A work vehicle comprising
a fluid reservoir,
a pump group comprising a fixed-displacement first pump and a fixed-displacement second pump such that the first and second pumps are flow-parallel to one another,
an actuator,
an open-center directional control valve positioned fluidly between the pump group and the actuator,
an electro-hydraulic diverter coupled fluidly to a point between the second pump and the directional control valve and to the fluid reservoir to divert flow from the second pump to the fluid reservoir when the diverter is opened,
a start-up sensor positioned to sense start-up of the work vehicle,
an engine,
an engine speed sensor positioned to sense information indicative of a rotational speed of the engine, and
a controller configured to
receive a start-up signal indicative of start-up of the work vehicle and an engine speed signal indicative of the engine speed,
determine if start-up of the work vehicle has occurred and the engine speed is below an engine speed threshold, and
command the diverter to open if start-up of the work vehicle has occurred and the engine speed is below the engine speed threshold.

15. The work vehicle of claim 14, wherein the start-up sensor is a key switch, and the controller is coupled electrically to the key switch.

16. The work vehicle of claim 14, wherein the engine speed sensor is an alternator coupled operably to the engine, and the controller is coupled electrically to the alternator.

17. The work vehicle of claim 14, wherein the engine speed threshold is a non-zero value below engine idle speed.

18. A work vehicle comprising
a first implement section,
a second implement section,
a section sensor configured to sense which of the first implement section and the second implement section is in focus,
a hydraulic system comprising
a fluid reservoir,
a pump group comprising a fixed-displacement first pump and a fixed-displacement second pump such that the first and second pumps are flow-parallel to one another,
open-center directional control valving,
an electro-hydraulic diverter coupled fluidly to a point between the second pump and the directional control valving and to the fluid reservoir to divert flow from the second pump to the fluid reservoir when the diverter is opened, and
a pressure sensor positioned to sense a supply pressure in the hydraulic system, and
a controller configured to
receive a supply pressure signal indicative of the supply pressure and a section signal indicative of which of the first implement section and the second implement section is in focus,
determine which of the first implement section and the second implement section is in focus,
select a first pressure threshold setting as a selected pressure threshold setting if the first implement section is in focus or a second pressure threshold setting as the selected pressure threshold setting if the second implement section is in focus,
determine if the supply pressure is at least the selected pressure threshold setting, and
if so, command the diverter to open.

19. The work vehicle of claim 18, wherein the first implement section is a backhoe section, and the second implement section is a loader section.

* * * * *